(12) United States Patent
Ono

(10) Patent No.: US 6,175,325 B1
(45) Date of Patent: Jan. 16, 2001

(54) MULTI-BAND MICROWAVE DETECTOR

(75) Inventor: Hisao Ono, Tokyo (JP)

(73) Assignee: Yupiteru Industries Co., Ltd. (JP)

( * ) Notice: Under 35 U.S.C. 154(b), the term of this patent shall be extended for 0 days.

(21) Appl. No.: 09/440,479

(22) Filed: Nov. 15, 1999

(30) Foreign Application Priority Data

Nov. 18, 1998 (JP) .................................................. 10-327645

(51) Int. Cl.$^7$ ...................................................... G01S 7/40
(52) U.S. Cl. ............................. 342/20; 342/89; 342/195; 455/227; 455/315
(58) Field of Search ............................... 342/20, 89, 195; 455/226.1, 227, 228, 315, 313, 314

(56) References Cited

U.S. PATENT DOCUMENTS

| | | | |
|---|---|---|---|
| 3,660,844 | * 5/1972 | Potter | 342/20 |
| 4,315,261 | * 2/1982 | Mosher | 342/20 |
| 4,626,857 | * 12/1986 | Imazeki | 342/20 |
| 5,268,689 | 12/1993 | Ono et al. . | |
| 5,361,069 | * 11/1994 | Klimek, Jr. et al. | 342/20 |
| 5,461,383 | 10/1995 | Ono et al. . | |

* cited by examiner

Primary Examiner—Bernarr E. Gregory
(74) Attorney, Agent, or Firm—Marger Johnson & McCollom, P.C.

(57) ABSTRACT

A multi-band microwave detector includes an antenna, a plurality of reception systems connected to the antenna in a parallel arrangement, a judgement circuit for judging whether or not a microwave signal detected by the reception systems is a detection target microwave signal, an alarm circuit for outputting an alarm when the judgement circuit judges the detected microwave signal to be a detection target microwave signal, wherein each reception system is constructed from a superheterodyne reception circuit having a prescribed intermediate frequency that is mutually different from the intermediate frequencies of all the other reception systems, and wherein all the reception systems are operated simultaneously during one detection cycle.

9 Claims, 3 Drawing Sheets

MULTI-BAND MICROWAVE DETECTOR

BACKGROUND OF THE INVENTION

1. Field of the Invention

The present invention relates to a microwave detector, and in particular relates to a wideband microwave detector capable of detecting microwaves in a plurality of different bands.

2. Description of the Prior Art

In general, prior art microwave detectors are equipped with a reception system in which microwaves are picked up or detected by an antenna and mixed with the output of a local oscillator which carries out a sweep over a prescribed sweep frequency to create an intermediate frequency signal that then undergoes amplification and wave detection.

Further, in the case where the detection target microwaves are present in a plurality of bands, the microwave detector needs to be able to carry out multi-band and wide-band operations. In such case, the number of reception systems connected to the antenna in the prior art microwave detector is increased to match the number of microwave frequency bands requiring detection. In other words, a reception system is established for each detection target band, and each of such plurality of reception systems is constructed from a local oscillator that oscillates at a prescribed frequency in accordance with a corresponding detection target band, and an intermediate frequency amplifier established in a pass frequency band in accordance with the corresponding detection target band.

Further, such plurality of reception systems is connected to the antenna in a parallel arrangement, and a selection means (e.g., a selector switch) is provided to alternatively select any one of the reception systems. With this structure, by using the selection means to select one reception system at a time in a sequential manner, it becomes possible to detect microwave signals present in a plurality of detection target bands.

However, the prior art microwave detector which is capable of multi-band and wide-band operations described above has the following problem. Namely, because each detection target band is sequentially selected one at a time to undergo a detection process, a relatively large amount of time is required to search all the detection target bands. In particular, this problem gets worse as the number of detection target bands is increased.

Further, in the case where the microwave detector is mounted in a motor vehicle (e.g., a car or a motorcycle) to detect microwave signals emitted from a radar type speed measurement device, because the vehicle will travel a relatively long distance during the time it takes to search all the detection target bands, there is the risk that the vehicle will reach a position near the radar type speed measurement device before detection of such microwave signals.

Furthermore, in the case where the microwave detector operates intermittently to conserve electricity, because an even greater amount of time will be required to search all the detection target bands, the problem described above (i.e., a long response time) is made worse. Further, if the suspension time is reduced in an attempt to alleviate such problem, the power conserving effect of such a microwave detector will be degraded.

SUMMARY OF THE INVENTION

In view of the background presented above, it is an object of the present invention to solve the problems of the prior art described above by providing a microwave detector which can carry out multi-band and wide-band operations with minimal power consumption without loss of detection sensitivity and detection accuracy.

In order to achieve the object stated above, the multi-band microwave detector according to the present invention is equipped with an antenna, a plurality of reception systems connected to the antenna in a parallel arrangement, judgement means for judging whether or not a microwave signal detected by the reception systems is a detection target microwave signal, and alarm means for outputting an alarm when the judgement means judges the detected microwave signal to be a detection target microwave signal, wherein each reception system is constructed from a superheterodyne reception circuit having a prescribed intermediate frequency that is mutually different from the intermediate frequencies of all the other reception systems, and wherein all the reception systems are operated simultaneously during one detection cycle.

In such a structure, even if the microwave detection bands are widened and the number of such microwave detection bands is increased, a detection target microwave signal included in the microwaves received by the antenna will be detected by at least one of the reception systems. Accordingly, in contrast with the prior art in which a plurality of reception systems are operated one at a time for each respective detection band, in the multi-band microwave detector according to the present invention, if a detection target microwave signal is included in the microwaves received by the antenna, such detection target microwave signal will be detected during a single search by one of the reception systems. In other words, even if the microwave detection bands are widened and the number of such microwave detection bands is increased, there will be no increase in the time required to carry out a single search.

Preferably, the multi-band microwave detector according to the present invention includes control means for controlling the operation and suspension of operation of each reception system.

Accordingly, by controlling the operations of all the reception systems, it is possible to search all the bands (frequency ranges) in a short time (i.e., in a single search), and by individually controlling each reception system, it is possible to determine which reception system received a microwave signal, and thereby determine the band of the microwave signal.

Further, in the multi-band microwave detector according to the present invention, the control means preferably operates all the reception systems when no detection target microwave signal is detected, and operates only one reception system when the judgement means judges a detection target microwave signal to have been detected, and preferably the judgement means carries out a further judgement to determine whether or not a detection target microwave signal is detected by the one reception system.

In the structure described above, during the time that no detection target microwave signal is detected, all the reception systems are operated to make it possible to judge the presence or absence of a detection target microwave signal in all the search bands within a short time interval. Then, when a detection target microwave signal is detected, the judgement means can be used to judge the presence or absence of the detection target microwave signal in the one reception system chosen for operation. Accordingly, it becomes possible to identify the reception system that received the detection target microwave signal.

In this way, an alarm can be outputted in accordance with the identified reception band and emission source. Further, if a search is carried out with special attention made to the detected band, it is possible to improve the detection accuracy.

Further, the multi-band microwave detector according to the present invention is preferably equipped with a first local oscillator and mixing means (i.e., the first mixer 5 in the embodiment of the present invention) for mixing the output of the first local oscillator with the reception signals of the antenna, and the first local oscillator and the mixing means are preferably used by each reception system.

In this way, such common use of elements makes it possible to design a compact multi-band microwave detector which is easy to control. Further, by making the first local oscillator capable of oscillating at both a fixed frequency and over a sweep range, it becomes possible to detect reverse detectors and the like, and for reason the first local oscillator is preferably arranged to have these two oscillation modes. Further, a second intermediate frequency amplifier is preferably provided to be used in common by the plurality of reception systems, whereby it becomes possible to make the multi-band microwave detector even more compact.

Further, the multi-band microwave detector according to the present invention preferably includes means for intermittently supplying power to the reception systems to carry out intermittent operations. With this arrangement, it becomes possible to reduce the consumption of power. For example, when the reception systems are operated intermittently, the power supply itself may be suspended during suspension of the reception systems (or the supply of power may be restricted to only those circuits that are absolutely essential). In this way, it is possible to suppress power consumption.

Further, by changing the suspension interval in accordance with the reception state, it is possible to economize power consumption without loss of detection accuracy, and this makes it possible to carry out a highly effective search. For example, the power suspension interval can be extended when no microwave signals are detected (during the standby mode in the actual embodiment), and the power suspension interval can be shortened or eliminated as soon as a microwave signal is detected (during the operation mode in the actual embodiment).

Furthermore, even though the reception systems are described as having a local oscillator, an intermediate frequency generating means and a wave detector, it is also possible to provide one of the reception systems with a plurality of local oscillators and intermediate frequency generating means. In other words, it is possible to use either a single heterodyne type reception system or a super heterodyne type reception system.

Moreover, although the control means in the preferred embodiment is described as being comprised of a microcomputer 2 and analog switches 10a and 10b which are operated based on the microcomputer 2, the present invention is not limited to such arrangement, and it is possible to provide a judgement means for judging which output from the reception systems will be used. Accordingly, by changing the position of the switches, for example, it is possible to activate/suspend frequency mixing of the first intermediate frequency amplifiers 7a, 7b and the second local oscillators 9a, 9b. As an example of an arrangement for activating/suspending such frequency mixing, the output of the second local oscillator can be turned OFF, a switch can be provided between the second mixer and the second local oscillator or the first intermediate frequency amplifier, and various means can be used to turn the first intermediate frequency amplifier ON or OFF.

DETAILED DESCRIPTION OF THE PREFERRED EMBODIMENTS

Figure 1:
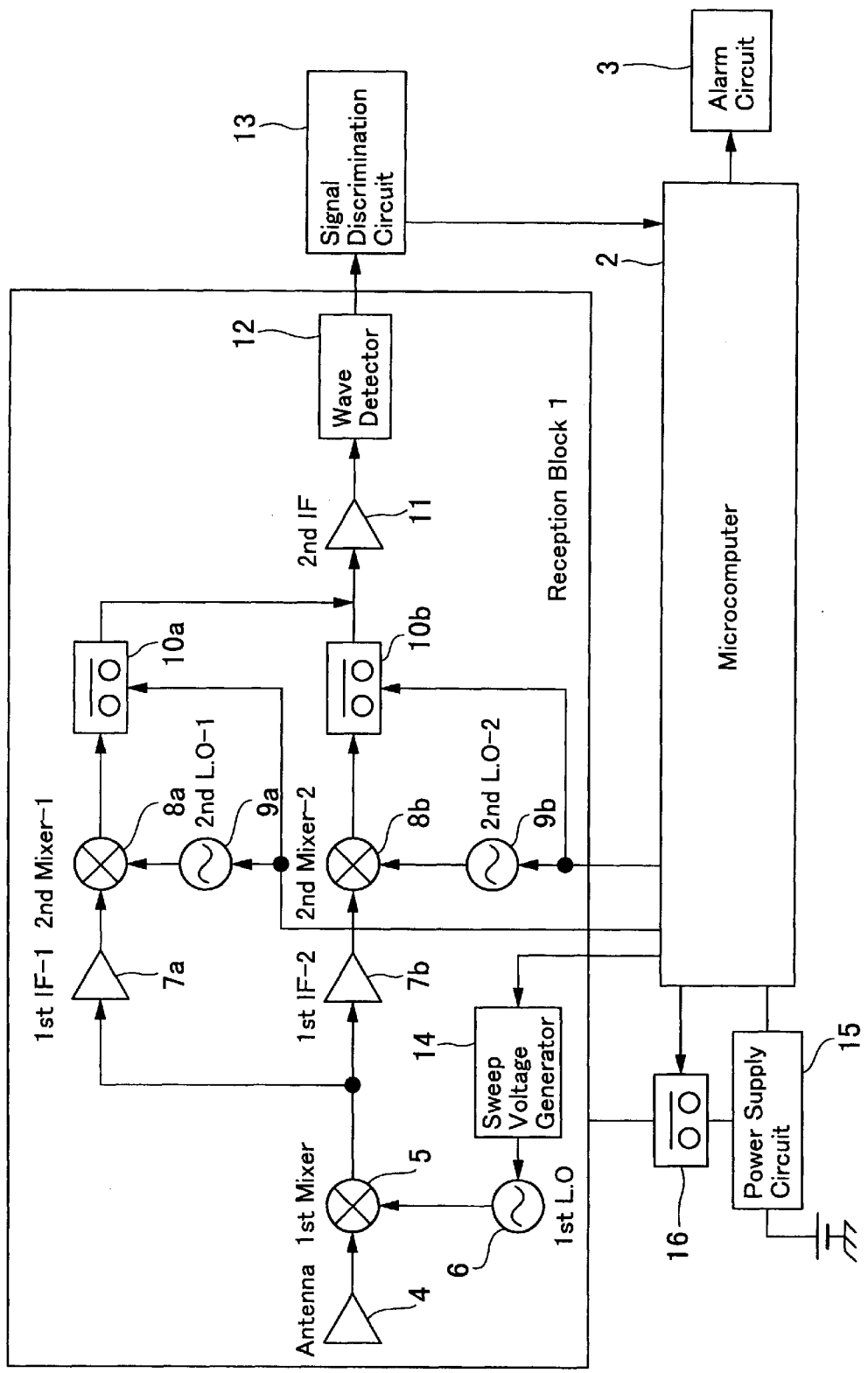
FIG. 1 is a block diagram showing the overall structure of the preferred embodiment of a multi-band microwave detector according to the present invention.

FIG. 1 is a block diagram showing the structure of the preferred embodiment of a microwave detector according to the present invention. As shown in FIG. 1, the microwave detector is equipped with a reception block 1 which picks up microwaves and carries out various signal processing operations, a microcomputer 2 which processes the output from the reception block 1, and an alarm circuit 3 which is activated by the output from the microcomputer 2.

Further, in the present embodiment, the reception block 1 is constructed from a double reception system comprised of a first reception system and a second reception system for carrying out signal processing of microwaves received from a horn antenna 4, and both the first and second reception systems are constructed from a double superheterodyne type reception circuit. In this regard, it should be noted that any number of reception systems may be arranged for the detection target, and such reception systems do not need to be double superheterodyne type circuits.

In this regard, the structure of the microwave detector will be described below for the case where the first reception system is a double superheterodyne type reception system. Namely, as shown in FIG. 1, microwaves from outside are picked up by a horn antenna 4 and mixed in a first mixer 5 with the output from a first local oscillator 6. As will be described later, the first local oscillator 6 is constructed from a voltage controlled variable frequency oscillator (VCO) to carry out a repeating sweep over a prescribed frequency range. Further, in addition to the fundamental harmonic of the fundamental frequency, the output of the first local oscillator 6 actively includes the secondary harmonic at twice the fundamental frequency, and the tertiary harmonic at three times the fundamental frequency.

The mixed output of the first mixer 5 is inputted into to a second mixer 8a via a first intermediate frequency amplifier 7a, and undergoes frequency mixing with the output of a second local oscillator 9a. Then, the mixed output from the second mixer 8a is inputted into a wave detector 12 via an analog switch 10a and a second intermediate amplifier 11. The analog switch 10a and another analog switch 10b are switched ON and OFF in accordance with switching signals from the microcomputer 2. Namely, both switches can be switched ON simultaneously, one switch can be switched ON while the other is switched OFF, or both switches can be switched OFF.

Further, the structure of the second reception system is basically the same as the first reception system. Namely, after the microwaves picked up by the horn antenna 4 undergo frequency mixing in the first mixer 5 with the output from the first local oscillator 6, the mixed output from the first mixer 5 is inputted into a first intermediate frequency amplifier 7b. Then, the output from the first intermediate frequency amplifier 7b is sent to a second mixer 8b to undergo frequency mixing with the output from a second local oscillator 9b. Next, the output from the second mixer 8b is inputted into the second intermediate frequency amplifier 11 via the analog switch 10b. In this way, the first reception system and the second reception system are designed to detect different frequency ranges (bands) which will be described later.

In this regard, because both reception systems use the second intermediate frequency amplifier 11, if both analog switches 10a and 10b are in their respective ON states, both processed outputs from the first and second reception systems will be inputted into the second intermediate frequency amplifier 11 and undergo wave detection. At this time, because the first local oscillator 6 is carrying out a sweeping operation, there is a time difference between the output from the second mixer 8a of the first reception system and the output of the second mixer 8b of the second reception system inputted into the second intermediate frequency amplifier 11, whereby the detected wave output appears only as the number of received microwave signals.

Further, even in the case where two or more microwave signals have frequencies which are close to each other within the bandwidth of the second intermediate frequency amplifier 11, a beat is formed and a detected wave output appears, and because this makes it possible to detect received signals, no problems are caused even for case where microwave signals from different bands are received at the same time.

The detected waved output detected by the wave detector 12 is transmitted to the computer 2 via a signal discrimination circuit 13. As will be described in detail later with reference to the drawings, if a microwave signal having a prescribed frequency is received in the detected wave output of the wave detector 12, a detected wave signal (peak) will be generated. In the case where this happens, a reception signal (pulse) corresponding to the detected wave signal (peak) is outputted, for example, by using comparator or the like in the signal discrimination circuit 13 to establish a threshold value Th as a base voltage for discriminating white noise.

Upon receiving this reception signal (pulse), the microcomputer 2 is designed to immediately activate the alarm circuit 3. Further, by carrying out reception modes described later, the microcomputer 2 can determine which band a microwave signal was received in, as well as discriminate the type of transmission source, and the activation state of the alarm circuit 3 may be changed in accordance with such discrimination results.

Next, the detection bands of each reception system will be described. First, Table 1 shows the three specific microwave frequency ranges that are used separately or in combination by radar type speed measurement devices.

TABLE 1

| X Band: | 10.475~10.575 [GHz] |
|---|---|
| K Band: | 24.000~24.250 [GHz] |
| Ka Band: | 33.400~36.000 [GHz] |

Further, the local oscillator of a normal microwave detector and the local oscillator used in a reverse detector use the frequency range 11.200~11.850 [GHz].

In this regard, in the present embodiment, the pass bands of the local oscillators and intermediate frequency amplifiers of the present embodiment are as shown in Table 2 below.

TABLE 2

| First Local Oscillator 6: | 11.43~11.70 [GHz] |
|---|---|
| First Intermediate Frequency Amplifier 7a: (First Reception System) | 300 [MHz] |
| First Intermediate Frequency Amplifier 7b: (Second Reception System) | 1.0 [GHz] |
| Second Intermediate Frequency Amplifier 11: | 10 [MHz] |

Now, because the local oscillators of microwave detectors and reverse detectors have poor signal purity, in addition to the frequency ranges described above, relatively strong secondary and tertiary harmonic frequency leakage occurs. The specific frequency ranges of each higher harmonic are shown in Table 3 below.

TABLE 3

| Reverse Detectors and General Microwave Detectors | |
|---|---|
| Second Higher Harmonic: First Local Oscillator 6 | 22.400~23.700 [GHz] |
| Second Higher Harmonic: | 22.86~23.40 [GHz] |
| Third Higher Harmonic: | 34.29~35.10 [GHz] |

Accordingly, reception involving the combination of the fundamental harmonic of the first local oscillator 6 and the frequency (1.0 GHz) of the first intermediate frequency amplifier 7b of the second reception system gives (11.43−1)~(11.70−1)=10.43~10.70 [GHz], and this covers the X band.

Further, reception involving the combination of the secondary harmonic of the first local oscillator 6 and the frequency (1.0 GHz) of the first intermediate frequency amplifier 7b of the second reception system gives (22.86+1)~(23.40+1)=23.86~24.40 [GHz], and this covers the K band.

Furthermore, reception involving the combination of the tertiary harmonic of the first local oscillator 6 and the frequency (300 MHz) of the first intermediate frequency amplifier 7a of the first reception system gives (34.29+0.3)~(35.10+0.3)=34.59~35.40 [GHz] and (34.29−0.3)~(35.10−0.3)=33.99~34.80 [GHz], and reception involving the combination of the tertiary harmonic of the first local oscillator 6 and the frequency (1.0 GHz) of the first intermediate frequency amplifier 7b of the second reception system gives (34.29+1.0)~(35.10+1.0)=35.29~36.10 [GHz] and (34.29−1.0)~(35.10−1.0)=33.29~34.10 [GHz], and because this involves a total reception over the range 33.29~36.10 [GHz], the Ka band is covered.

Moreover, in the case where the first local oscillator is fixed at 11.40 [GHz], the combination of the secondary higher harmonic (22.80 [GHz]) and the frequency (300 MHz) of the first intermediate frequency amplifier 7a of the first reception system gives (22.80+0.3)=23.1 [GHz], and this value lies within the secondary harmonic sweep frequency range (22.400~23.700 GHz) of the local oscillator of reverse detectors and the like.

Accordingly, in the case where a detection signal is present when the first local oscillator 6 is in a sweep state and only the first reception system is operated, it is possible to judge the received microwave signal to be within the Ka band. Further, in the case where a detection signal is present when the first local oscillator 6 is in a sweep state and only the second reception system is operated, it is possible to judge the received microwave signal to be within any of the X, K and Ka bands. Furthermore, in the case where a detection signal is present when the first local oscillator 6 is in a fixed state and only the first reception system is operated, it is possible to judge the received microwave signal to be from a reverse detector or another microwave detector.

Now, while omitting a detailed description, it should be noted that in the above-described case where only the second reception system is operated, various discrimination methods may be used to carry out a discrimination among the three possible bands. For example, band discrimination can be carried out by observing the generation period (at the start of the sweep, during the course of the sweep, near the end of the sweep) of the detection signal, or by appropriate switching between a single superheterodyne system and double superheterodyne system such as that disclosed in Japanese Laid-Open Patent Application No. HEI 7-35845. Similarly, in the case where the first local oscillator 6 is operated at a fixed frequency, a separate discrimination means may be provided in the present embodiment to make it possible to discriminate whether the transmission source is a reverse detector or another microwave detector.

In accordance with the detection principle described above, two modes are established in the microcomputer 2 of the present embodiment, namely, a standby mode which is established when the microcomputer 2 receives no input from the signal discrimination circuit 13 over a prescribed time interval, and a reception mode which is established after an input is received by the microcomputer 2 while in the standby mode.

Figure 2:
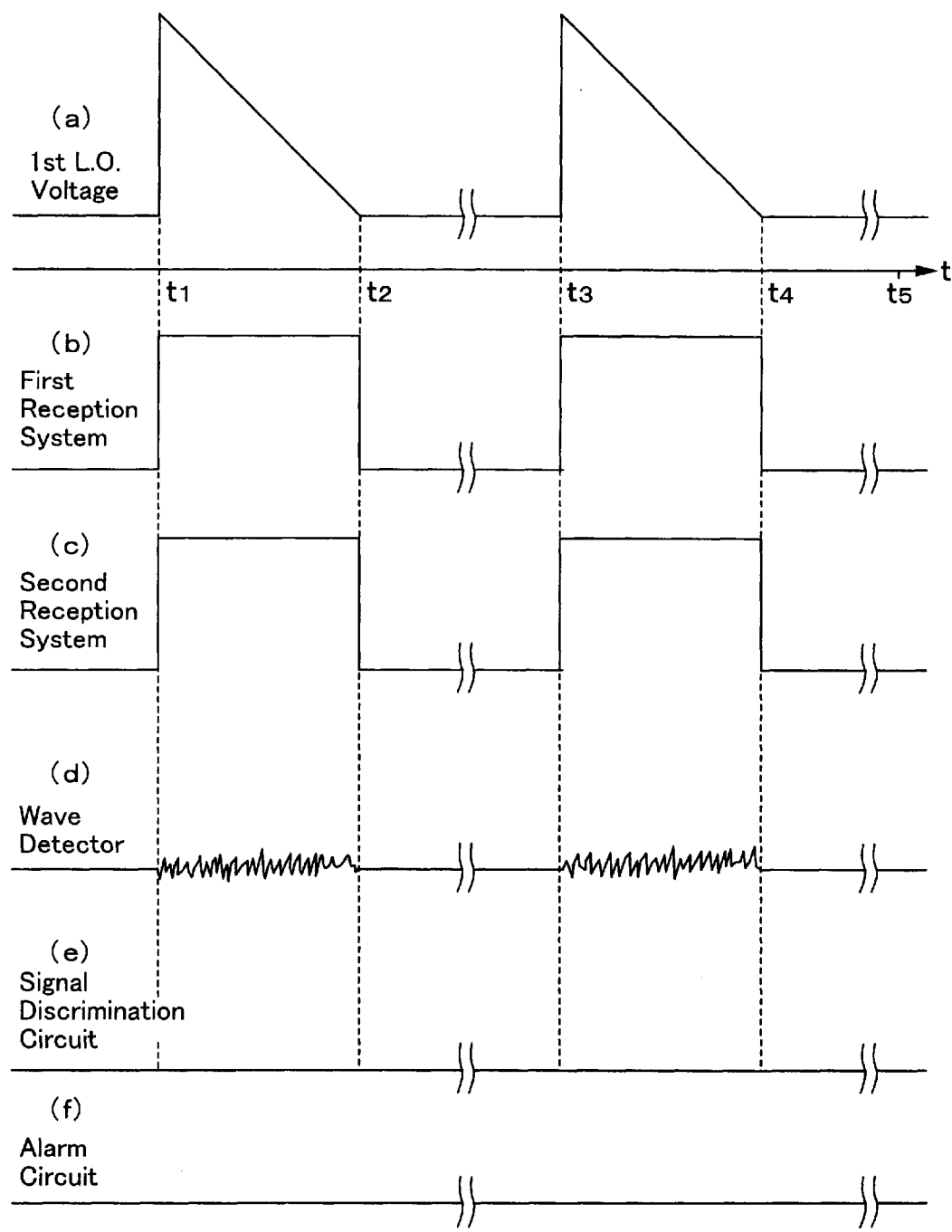
FIG. 2 is a waveform diagram showing outputs of the reception systems and control devices of the microwave detector according to present invention, during a standby mode.
Figure 3:
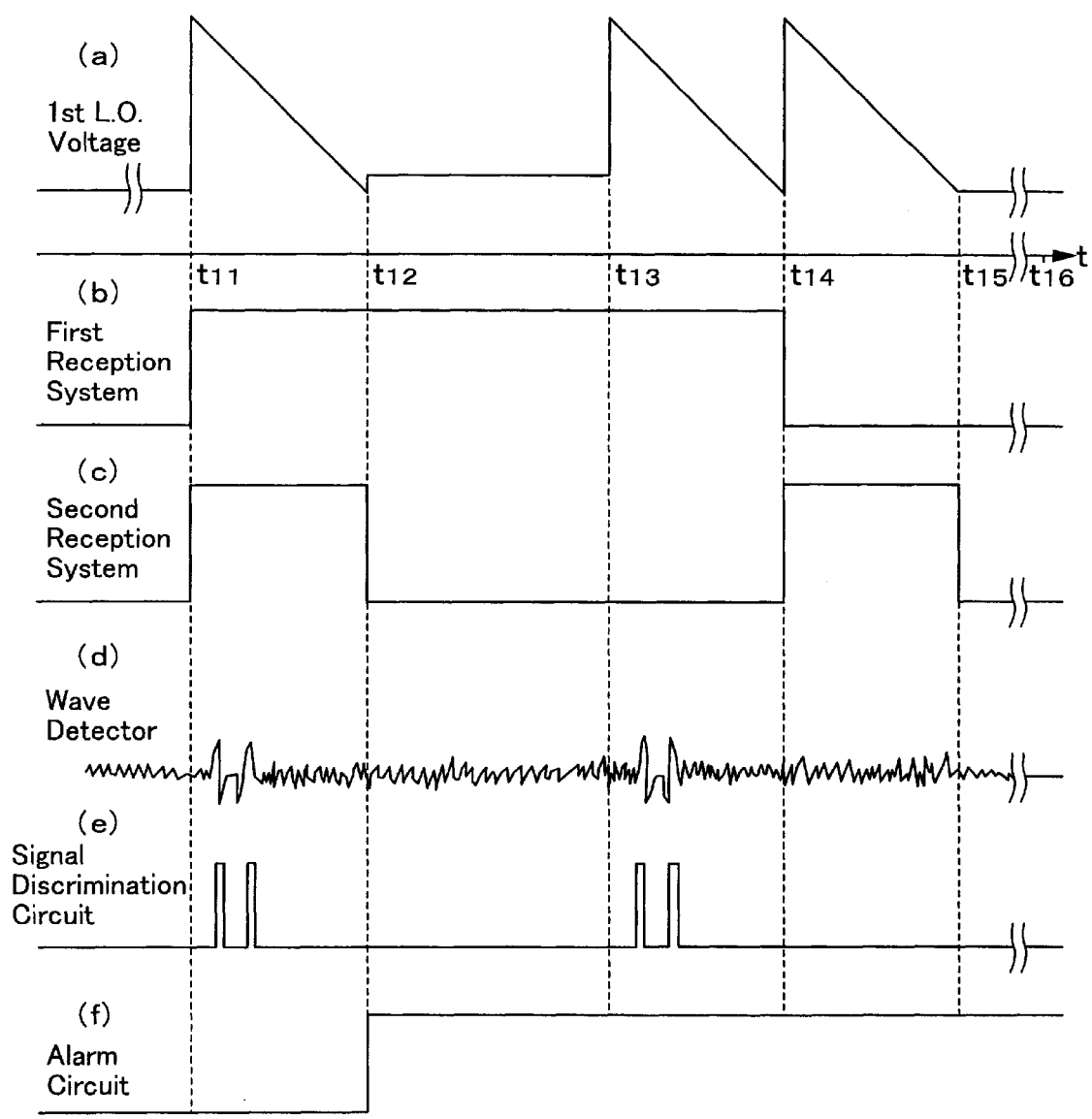
FIG. 3 is a waveform diagram showing outputs of the reception systems and control devices of the microwave detector according to present invention, when a standby mode becomes a reception mode.

In this connection, FIGS. 2 and 3 show the state of the pulse inputted into the microcomputer 2 and the activation state of the alarm circuit 3 when the microcomputer receives such pulse during the time intervals when the microcomputer 2 is operating in the standby mode and reception mode described above. Namely, FIG. 2 shows the pulse state and activation state during the standby mode, and FIG. 3 shows the pulse state and activation state during the reception mode.

Namely, part (a) of FIG. 2 shows the waveform outputted from the first local oscillator 6. In this connection, a sweep voltage generator 14 is connected to the first local oscillator 6 to control the voltage applied to the first local oscillator 6 in accordance with data from the microcomputer 2. Accordingly, the first local oscillator 6 undergoes a sawtooth waveform oscillation over the single cycle during the time interval t1~t2.

In the present embodiment, a switch 16 is provided on a power supply route from a power supply circuit 15 to the reception block 1, and this switch 16 is turned ON to supply power to the reception block 1 and turned OFF to cut off the supply of power to the reception block 1 in accordance with data from the microcomputer 2. Accordingly, because the microcomputer 2 is also connected to the sweep voltage generator 14, immediately after the single sweep of the first local oscillator is completed at the end of the time interval t1~t2, the power supplied to the reception block 1 is suspended. Then, after the prescribed time interval t2~t3 has elapsed, power is once again supplied to the first local oscillator 6 to carry out a single sweep over the time interval t3~t4. In other words, so long as no detection target microwave signal is detected during the standby mode, the operation cycle carried out over the time interval t1~t3 is repeated.

Further, parts (b) through (f) of FIG. 2 respectively show the ON and OFF states of the analog switch 10a in the first reception system, the ON and OFF states of the analog switch 10b in the second reception system, the output pulses of the wave detector 12, the output pulses of the signal discrimination circuit 13, and the activation state of the alarm circuit 3.

In the present embodiment, the analog switches 10a and 10b are both in their respective ON states during the standby mode. Accordingly, while power is being supplied to the reception block 1, either reception system can detect microwave signals picked up by the antenna 4, and when power is suspended, the operations of both systems are suspended. This state is shown in parts (b) and (c) of FIG. 2. Further, this arrangement of turning both the analog switches 10a and 10b ON and OFF at the same time makes it possible to carry out intermittent operations without having to turn the power supply itself ON and OFF. Now, as shown in parts (d) through (f) of FIG. 2, because no target microwave signal is detected in the time interval t1~t5 shown in the drawings, the outputs of such elements do not change.

At this point it should be noted that the cycle repeated for the standby mode is not limited to a specific length, and it is possible to establish an appropriate length in accordance with the detection target microwaves. In other words, the time interval of a single sweep of the first local oscillator 6 does not have to be established to match the time interval t1~t2 during which power is supplied to the reception block 1, and may be set at a longer time interval. Accordingly, a plurality of standby modes may be established depending on the cases involved. For example, the time interval over which the power supplied to the reception block 1 is suspended when the residual power of the wave detector diminishes may be made longer than a normal standby mode in order to reduce the power consumption of the wave detector, or when switching back to a standby mode from a reception mode established after a target microwave signal was detected, the time interval over which the power supplied to the reception block 1 is suspended may be made somewhat shorter than a normal standby mode.

Now, in the situation shown in FIG. 3, because a detection target microwave signal is picked up by the horn antenna 4 in the time interval t11~t12 during the standby mode, the mode of the microcomputer 2 is switched to the reception mode from the time t12.

In the present embodiment, after the first local oscillator 6 has carried out three sweeps in the time interval t12~t15, the power supplied to the reception block 1 is temporarily cut off for the time interval t15~t16, and during this time interval the reception mode repeats one operation cycle. Of course, it is also possible to omit the interval for temporarily suspending the supply of power, and in its place arrange for the operations of each reception system to be switched to repeat the one operation cycle involving the three sweeps carried out in the time interval t12~t15. Then, while the process for detecting microwave signals is carried out during the reception mode, if no detection target microwave signals are detected within a prescribed cycle interval, the microcomputer 2 switches back to the standby mode.

Now, because the first and second reception systems are operated simultaneously in the standby mode, if a microwave signal belonging to any of the detectable bands (frequency ranges) of the reception systems is received, a detection signal will be outputted. In this regard, such standby mode is designed to make it possible to discriminate the type (i.e., the band) of the received microwave signal.

Namely, as shown in part (a) of FIG. 3, if a detection target microwave signal is detected in the time interval t11~t12 during the standby mode, the reception mode is established, and then during the first sweep over the time interval t12~t13, the sweep voltage generator 14 applies a fixed voltage to the first local oscillator 6, whereby the first local oscillator 6 oscillates at a fixed oscillation frequency. Then, during the second sweep over the time interval t13~t14 and the third sweep over the time interval t14~t15, a sawtooth sweep voltage is applied to the first local oscillator 6 in the same manner as for the standby mode.

Now, as shown in parts (b) and (c) of FIG. 3, when the first local oscillator 6 oscillates at a fixed frequency, only the first reception system is operated. Further, this state is maintained as the first local oscillator 6 begins to carry out a sawtooth sweep from time t13. In other words, only the first reception system is operated. Then, during the second sawtooth sweep over the time interval t14~t15, the state of operations of the reception systems is reversed, and only the second reception system is operated. In particular, this switching of the reception systems is easily carried out by switching the analog switches 10a and 10b ON or OFF. In other words, each reception system is operated by switching the analog switch provided therein to an ON state.

In this way, the first search (in which the first local oscillator oscillates at a fixed frequency) carried out in the reception mode over the time interval t12~t13 makes it possible to judge whether or not a microwave signal is from a reverse detector or the like. Further, the next search (in which the first reception system is ON) makes it possible to search the Ka band, and the final search (in which the second reception system is ON) makes it possible to search the X, K and Ka bands. At this point, it should be noted that the order of these three searches is not limited to that described above, and it is possible carry out such searches in any desired order.

Now, as shown by parts (d) through (f) of FIG. 3, in this example there is a detected wave output when the first reception system is operated while the first local oscillator 6 carries out a sawtooth sweep over the time interval t13~t14. Accordingly, the received microwave signal can be judged to be a microwave signal belonging to the Ka band.

Further, as shown by part (f) of FIG. 3, if a detection target microwave signal is received in the time interval t11~t12 during the standby mode, the alarm circuit 3 immediately outputs an alarm. Namely, the alarm circuit 3 outputs an alarm signal to one or more alarm devices such as an audio alarm device (e.g., a speaker) for emitting an audio alarm and a visual alarm device (e.g., a lamp such as an LED or the like) for emitting a visual alarm.

In this connection, in the case where the microwave band in the reception mode can be identified and the microwave emission source can be detected, the alarm output may be switched in accordance with the band identification/detection results. In this case, when the emission source is recognized to be a reverse detector based on the presence of a detected wave output when the first local oscillator 6 is oscillating at a fixed oscillation frequency, the microwave detector may be arranged to output an alarm and temporarily suspend search operations or temporarily suspend search operations without outputting an alarm.

Now, if no detection target microwave signal is detected, the microwave detector is designed to return to the standby mode to detect microwave signals. Further, during the reception mode, the power supplied to the reception block 1 may be suspended for a prescribed time interval after the completion of each wave detection process cycle of the reception mode.

In this regard, even though the present embodiment was described as having two modes comprised of a standby mode and a reception mode which is used to check whether the received microwave signal is an actual microwave signal, the reception mode can be eliminated when it becomes necessary to reduce the power consumption of the microwave detector. Namely, when operating a plurality of reception systems simultaneously, because an alarm will be outputted when any one of such reception systems detects a microwave signal, by individually controlling the ON and OFF states of each reception system, it is possible to identify the reception system that received the microwave signal.

Further, in the embodiment described above, the multi-band microwave detector uses a harmonics mixer circuit in which the fundamental frequency of the first local oscillator 6 is used for the reception of X band microwave signals, the secondary harmonic is used for the reception of K band microwave signals, and the tertiary harmonic is used for the reception of Ka band microwave signals. However, the present invention is not limited to this structure, and it is possible to employ other arrangements for multi-band reception. For example, the first reception system can be arranged to detect X band microwave signals, and the second reception system can be arranged to detect K band microwave signals.

In such a structure, by inputting the output from each reception system into a single wave detector, it is possible to simultaneously detect microwave signals in each band, and because this reduces the operation time required for carrying out a search of all bands, the intermittence ratio can be enlarged to reduce power consumption. Further, in such case, if each reception system is operated one at a time immediately after a microwave signal is detected, it is possible to reliably identify which band the microwave signal came from, and then prescribed processes can be carried out in accordance with such identified band.

Furthermore, even though the reception systems are described as having a local oscillator, an intermediate frequency generating means and a wave detector, it is also possible to provide one of the reception systems with a plurality of local oscillators and intermediate frequency generating means. In other words, it is possible to use either a single heterodyne type reception system or a super heterodyne type reception system.

Moreover, although the control means in the preferred embodiment is described as being comprised of a microcomputer 2 and analog switches 10a and 10b which are operated based on the microcomputer 2, the present invention is not limited to such arrangement, and it is possible to provide a judgement means for judging which output from the reception systems will be used. Accordingly, by changing the position of the switches, for example, it is possible to activate/suspend frequency mixing of the first intermediate frequency amplifiers 7a, 7b and the second local oscillators 9a, 9b. As an example of an arrangement for activating/suspending such frequency mixing, the output of the second local oscillator can be turned OFF, a switch can be provided between the second mixer and the second local oscillator or the first intermediate frequency amplifier, and various means can be used to turn the first intermediate frequency amplifier ON or OFF.

As described above, in the microwave detector according to the present invention, because all the reception systems of the microwave detector are operated simultaneously during one detection cycle, even when the measurement bands are widened or the number of measurement bands are increased, such changes do not increase the time required for one search through all the bands. In other words, changes in band width and changes in the number of bands does not reduce the number of search cycles that can be carried out over a prescribed time interval.

Accordingly, there is no loss of detection accuracy when the microwave detector according to the present invention is used to detect microwave signals in each of a plurality of bands, regardless of the width and number of such bands.

What is claimed is:

1. A multi-band microwave detector, comprising:

an antenna producing a single antenna output signal;

a plurality of reception systems in a parallel arrangement, each reception system coupled with the antenna to receive the single antenna output signal; and judgement means for judging whether or not a microwave signal detected by the reception systems is a detection target microwave signal, wherein each reception system is constructed from a superheterodyne reception circuit having a prescribed intermediate frequency that is mutually different from the intermediate frequencies of all the other reception systems, and wherein all the reception systems are operated simultaneously during one detection cycle.

2. The detector of claim 1, further comprising control means for controlling operation and suspension of operation of each individual reception system.

3. The detector of claim 2, wherein the control means operates all the reception systems when no detection target microwave signal is detected, and operates only one reception system when the judgement means judges a detection target microwave signal to have been detected, and wherein the judgement means carries out a further judgement to determine whether or not a detection target microwave signal is detected by the one reception system.

4. The detector of any one of claims 1–3, further comprising;

a first local oscillator; and mixing means for mixing an output of the first local oscillator with the reception signals of the antenna, wherein the first local oscillator and the mixing means are used by each reception system.

5. The detector of any one of claims 1–3, further comprising means for intermittently supplying power to the reception systems to carry out intermittent operations.

6. The detector of any one of claims 1–3, further comprising:

alarm means for outputting an alarm when the judgement means judges the detected microwave signal to be a detection target microwave signal.

7. A method for detecting microwaves comprising:

sweeping once a single antenna output signal with a detection ability in simultaneously a plurality of frequency bands to generate a single standby signal while in a standby mode;

judging the standby signal; and if a detection target microwave signal is judged to be included in the standby signal, sweeping again with a detection ability in a single one of the plurality of the frequency bands while in a reception mode distinct from the standby mode.

8. The method of claim 7, further comprising:

if sweeping while in the reception mode detects again the detection target microwave signal, sweeping one more time with a detection ability in the same single frequency band to confirm the detection target microwave signal.

9. The method of claim 7, further comprising:

if sweeping while in the reception mode does not detect a detection target microwave signal, sweeping one more time with a detection ability in a different one of the plurality of the frequency bands while still in the reception mode.

* * * * *